May 25, 1954 — A. D. BRUNDAGE — 2,679,392
POWER WINDOW OPERATOR
Filed Feb. 12, 1951 — 2 Sheets-Sheet 1

INVENTOR.
Alan D. Brundage
BY Maxwell K. Murphy
ATTORNEY

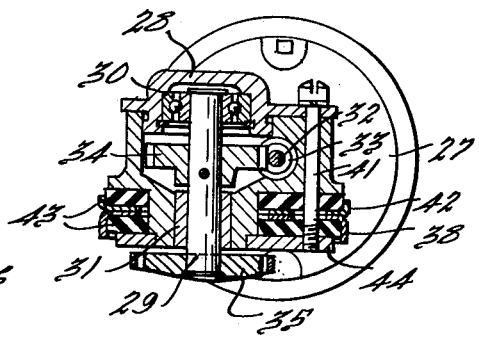
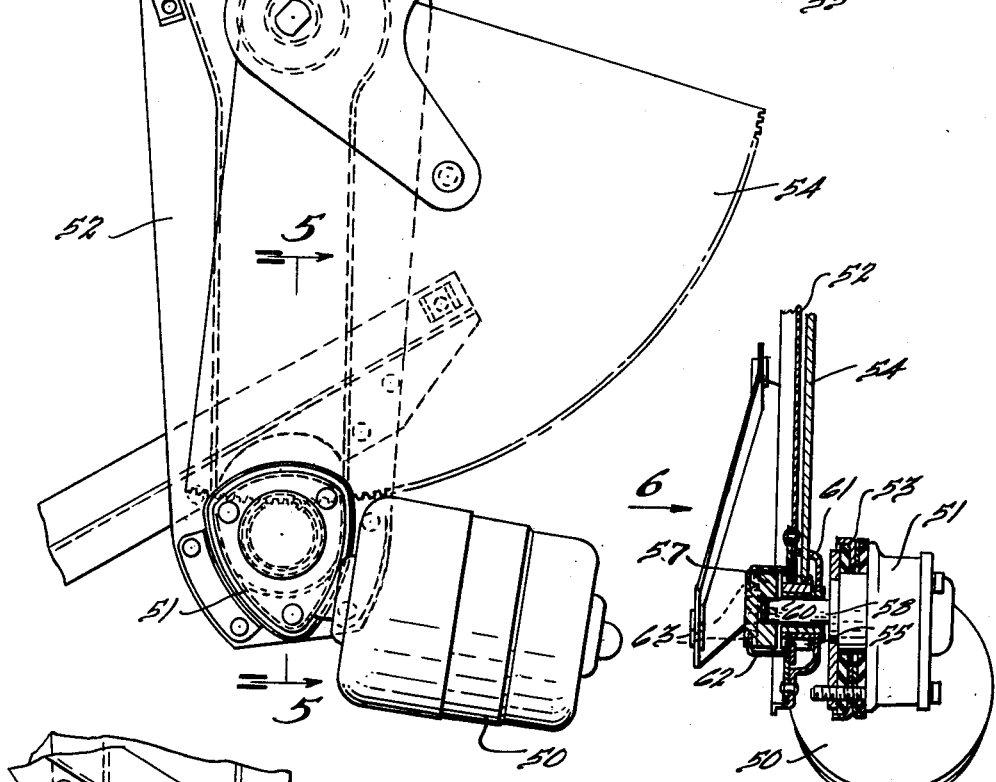
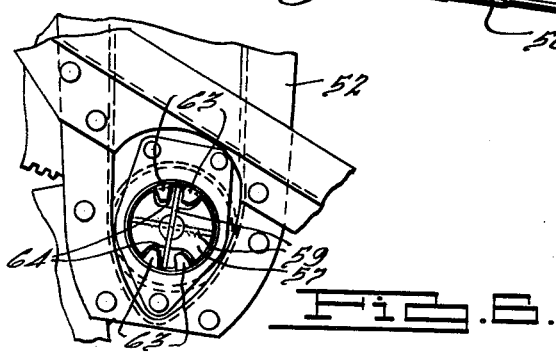

UNITED STATES PATENT OFFICE 2,679,392

POWER WINDOW OPERATOR

Alan D. Brundage, Detroit, Mich., assignor to F. L. Jacobs Co., Detroit, Mich., a corporation of Michigan Application February 12, 1951, Serial No. 210,553

6 Claims. (Cl. 268—124)

This invention pertains to power driven window operating means, and in particular to an electrically driven window operator for motor vehicles, streetcars, railroad cars and the like.

During recent years power driven window operating mechanism has come into general use on higher priced automobiles. Customer acceptance has created a demand for power operators on lower priced cars, but attempts to adapt the relatively complicated and expensive apparatus for large scale, low cost production have been generally unsuccessful. This has been due in great measure to the fact that hydraulically operated mechanism has been used almost exclusively, which requires piping, valves, regulators, sumps, etc. Window operators driven by small electric motors have been proposed, but have proven expensive to manufacture and noisy in use.

The prime object of the invention described herein its to provide an improved self-contained power window operator which eliminates the need for hydraulic mechanism of any kind and which requires no piping.

Another object is to provide a completely electrically driven window operator of economical construction which is adapted for mounting on a vehicle body interchangeably with the manual operator.

A further object is to provide a power window operator which incorporates an improved mounting and drive coupling which, in operation, renders the mechanism quiet in use.

Further objects and advantages of the invention will become apparent from the following specification in which preferred embodiments of the invention are described.

In the drawings accompanying the description:

Fig. 3 is a section along line 3—3 of Fig. 1;

Fig. 4 is a fragmentary view of another type of window operator showing a slightly modified form of power unit;

Fig. 5 is a section along line 5—5 of Fig. 4; and

Fig. 6 is a fragmentary view of Fig. 5 looking in the direction of the arrow 6.

Figure 1:
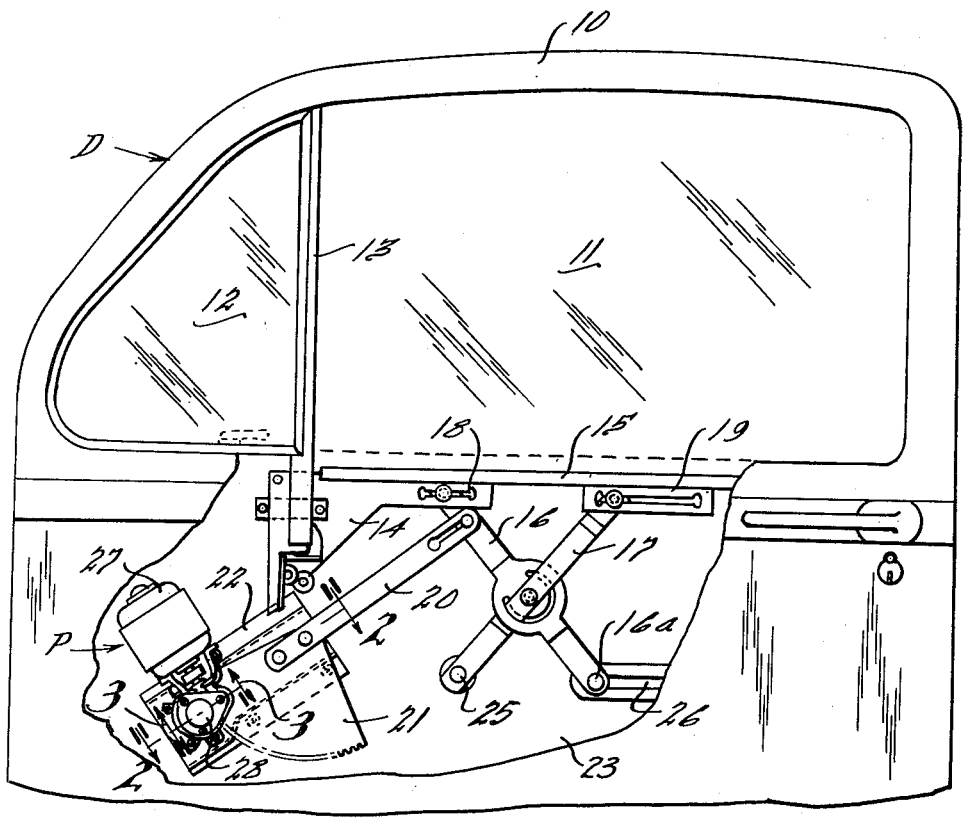
Fig. 1 is a fragmentary side elevation, partly broken away, of an automobile door embodying the invention.
Figure 2:
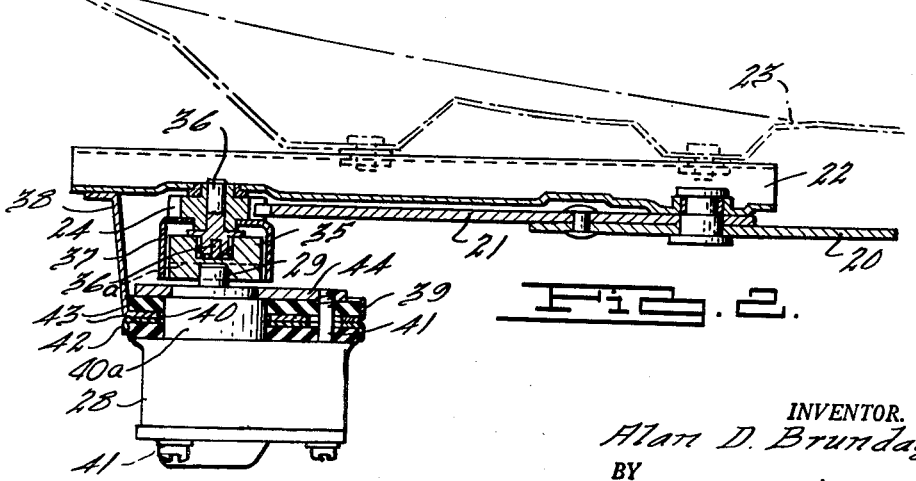
Fig. 2 is an enlarged sectional view taken on line 2—2 of Fig. 1.

Referring now to Figs. 1 and 2, it may be seen that there is illustrated an automobile door D, which may be a front door having a window frame 10, including a sloping front pillar and an upright rear pillar, said pillars merging into an upper header to provide a window frame of which the upper portion is in the form of a closed figure defining a window opening. This main window opening is adapted to be closed by means of a vertically slidable glass 11 and a laterally swinging glass 12. The latter panel is of the so-called "ventipane" type disposed at the forward part of the window opening and the panels 11 and 12 are preferably arranged so that in their closed positions they extend in substantially parallel planes to completely close the main window opening. The panel 12 may be pivoted by any suitable means (not shown) for swinging movement. The panel 11 has an upright channel member 13 secured to the leading edge thereof against which the rear edge of the pane 12 is adapted to seat.

The lower portion of the member 13 projects into the window well below the opening and is secured by screws or other suitable means to the forward part of a stamped metal bracket 14, this bracket being spot welded to the bottom forward edge of a channel member 15 which embraces and is carried by the lower edge of the glass 11.

Any suitable window regulating means may be utilized for raising and lowering the panel 11. In the example shown, the mechanism is of the well known "cross-arm" type and comprises a pair of intersecting arms 16 and 17 which carry studs at their outer ends adapted to be connected, respectively, within a horizontal slot 18 in the bracket 14 and a horizontal slot in a bracket 19 secured to the bottom of member 15.

The mechanism described is driven by an arm 20 secured to a sector gear 21 rotatable upon a mounting plate 22. The plate 22 is securely fastened as by rivets or bolts to the inner door panel 23 (Fig. 2). The sector gear 21 is driven by a pinion 24. In manually operated window regulators, the pinion 24 is mounted on a handle shaft which carries the usual friction clutch for holding the window in adjusted position. This structure is not illustrated because it is conventional and forms no part of the present invention. The lower end of the cross arm 17 is pivoted at 25 to the inner door panel 23, and the lower end of the cross arm 16 has a stud 16a slidably connected in a guide slot 26 in the panel 23.

The power unit, generally designated in the drawing by the letter "P," comprises a motor, gearbox and mounting means. The motor 27 is carried by a die cast gearbox housing 28 (see Figs. 2 and 3). The housing contains a driven shaft 29 journaled therein by means of a bearing 30 and bushing 31. The motor shaft 32 carries a worm 33 disposed in mesh with a worm wheel 34 fixed on the shaft 29. The outer end of shaft 29 drivingly engages a coupling 35. The member 35 is of rubber or equivalent material and has cup-like depressions in opposite sides thereof for receiving the ends of shafts 29 and 36 respectively. Each of these shafts is provided with a slot for receiving metal cross-members 36a carried by the coupling. The cross-members are disposed at right angles to each other and on opposite sides of coupling member 35. Both cross-members are bonded to the rubber during the molding thereof and thus the torque of the shaft 29 is transmitted to the shaft 36 through the resilience of the coupling. The pinion 24 which drives the sector gear 21 carries a sleeve 37 which entirely surrounds the coupling 35 and confines the material during periods of heavy torque requirements.

The gearbox housing 28 is mounted on the plate 22 by means of a bracket 38 which has a flange 39 formed on the flat vertically disposed portion 40 thereof. The portion 40 has enlarged holes for accommodating the portion 40a of housing 28 and fastening bolts 41. Disposed in back-to-back relation with the portion 40 is a flanged member 42 (Figs. 2 and 3). Rubber pads 43 are disposed in the pan-like depressions formed by the flanges on parts 40 and 42, which pads are provided with apertures for receiving and snugly engaging the housing 28 and bolts 41. The latter pass through the gearbox housing and threadedly engage a plate 44. It may thus be seen that when the three bolts 41 are tightened, the entire power assembly is firmly yet resiliently secured to the member 22.

It will be readily understood that the motor 27 is connected to the vehicle battery through wires and switches (not shown) and that energization of the motor in one direction or the other by the driver will cause the window panel 11 to be raised or lowered through the intermediary of the driven shaft 29, coupling 35, shaft 36, pinion 24, sector gear 21 and link 20.

Figs. 4, 5 and 6 show a modified form of the invention as applied to a rear door. In the example shown, provision is made for reducing the effective overall thickness of the power unit such that it is adaptable to doors of relatively thin section.

In the modification, the electric motor 50 is carried by a die cast gearbox 51, the latter being mounted on a plate 52, which plate is, in turn, mounted on the inner framing of the door. A resilient "sandwich" 53, similar to the one previously described, is interposed between the housing and the plate. A sector gear 54 driven by a pinion 55 operates the window panel (not shown) through a bellcrank 56.

As may be more clearly seen in Fig. 5, the resilient coupling 57 is mounted on the opposite side of the pinion and sector from the motor. The shaft 58 is slotted at the end and engages one of the bonded cross-members 59 of the coupling 57. The pinion 55 is separated from the shaft 58 by a bushing 60 carried by a bracket 61 riveted to the plate 52.

A driving sleeve 62 surrounds the resilient member of the coupling and is provided with integral tabs 63 which are received in slots 64 cut in the coupling member such that one of the cross members 59 (Fig. 6) is disposed between a pair of tabs at each side and a driving relationship is established. The sleeve 62 is elongated toward the motor and has integral teeth which engage the pinion 55 as shown in Fig. 5.

It may be seen then that in this modification of the invention, the drive from the shaft 58 is transmitted to the sector 54 through the coupling 57, sleeve 62 and pinion 55. Because the coupling is disposed on the opposite side of the pinion and sector gear from the motor, better utilization of space results.

It has been found that use of rubber, or equivalent yieldable material, in the mounting of the power unit and in the drive between the motor and the pinion, renders the mechanism sufficiently quiet in use to make it acceptable to automobile users. Vibration and drumming are eliminated and the raising and lowering of the window is accomplished without any greater noise than is present in manually operated window operators. In addition, the few parts and simplicity of my invention have enabled adoption thereof for cars in the lower price range.

While I have shown only preferred embodiments of my development for illustrative purposes, it will be understood that by so doing, I do not intend to limit the invention except as set forth in the appended claims.

I claim:

1. In apparatus for shifting a slidable panel relative to a body structure of a vehicle, a bracket supported in substantially rigid relation on the body structure, a gear housing having a surface adjacent a part of said bracket, a resilient pad between said housing surface and said part of the bracket, means securing the gear housing to said bracket part with the pad therebetween affording movements of the housing relative to the bracket without transmitting vibrations to the bracket and the body structure, an electric motor carried by the gear housing, a shaft extending from the gear housing driven by said motor, a pinion normally in axial alignment with said shaft, means substantially rigid with the body structure supporting the pinion for rotation, a gear sector in mesh with the pinion for shifting the panel, and a shock absorbing universal coupling connecting the pinion to said shaft.

2. Apparatus according to claim 1 wherein the universal coupling is at one side of the gear sector and the gear housing is at the other side of the gear sector.

3. Apparatus according to claim 1, wherein the gear housing and the universal coupling are both at the same side of the gear sector.

4. In apparatus for actuating a slidable panel relative to a body structure of a vehicle, a bracket mounted in substantially rigid relation with the body structure, a gear housing having a surface arranged along said bracket, a resilient pad between said housing surface and said bracket, means securing the gear housing to said bracket with the pad therebetween affording movements of the gear housing relative to the bracket without transmitting vibrations to the bracket, an electric motor carried by the gear housing, a shaft extending from the gear housing driven by said motor, a pinion for actuating the panel journalled for rotation on means secured to the body structure, and a universal coupling connecting the pinion to said shaft accommodating changes in positions of the shaft relative to the pinion.

5. In apparatus for shifting a panel relative to a body structure of a vehicle, a bracket secured to the body structure, a gear housing having a surface arranged along a part of said bracket, a resilient pad between said housing surface and said part of the bracket, another resilient pad along an opposite side of said bracket part, a plate along a free face of the second pad, anchor members extending through the bracket part and the pads securing the gear housing to said plate and the bracket part with said pads affording movements of the gear housing relative to the bracket without transmitting vibrations therethrough, an electric motor carried by the gear housing, a shaft extending from the gear housing driven by said motor, a pinion driven by said shaft, and a gear sector in mesh with the pinion and connected to the panel for shifting the same.

6. Apparatus according to claim 4, wherein the universal coupling includes resilient material and means surrounding the resilient material limiting the displacement thereof.

References Cited in the file of this patent

UNITED STATES PATENTS

| Number | Name | Date |
|---|---|---|
| 1,951,013 | Flinterman | Mar. 13, 1934 |
| 1,992,528 | Geyer | Feb. 26, 1935 |
| 2,124,037 | Lavigne | July 19, 1938 |
| 2,311,972 | Simpson | Feb. 23, 1943 |
| 2,317,490 | Simpson | Apr. 27, 1943 |
| 2,331,260 | Wiseman | Oct. 5, 1943 |

FOREIGN PATENTS

| Number | Country | Date |
|---|---|---|
| 544,458 | Great Britain | Apr. 14, 1942 |